United States Patent

Yoshida et al.

[11] Patent Number: 5,736,263
[45] Date of Patent: Apr. 7, 1998

[54] MAGNETIC RECORDING MEDIUM COMPRISING SUCCESSIVE MAGNETIC METALLIC FILMS OF IRON, NICKEL, AND COBALT DEPOSITED ON A SUBSTRATE

[75] Inventors: Osamu Yoshida; Noriyuki Kitaori; Hirohide Mizunoya; Katsumi Sasaki; Yuzo Matsuo; Shigemi Wakabayashi; Akira Shiga, all of Ichikaimachi, Japan

[73] Assignee: Kao Corporation, Tokyo, Japan

[21] Appl. No.: 598,419

[22] Filed: Feb. 8, 1996

[30] Foreign Application Priority Data

Feb. 8, 1995 [JP] Japan .................. 7-020587

[51] Int. Cl.$^6$ .................................. G11B 05/66
[52] U.S. Cl. .................. 428/611; 428/656; 428/678; 428/679; 428/680; 428/694 TM; 428/694 TS; 428/900; 428/928; 427/128; 427/131

[58] Field of Search .................. 428/611, 656, 428/678, 679, 680, 694 TM, 694 TS, 900, 928; 427/128, 131

[56] References Cited

U.S. PATENT DOCUMENTS 4,759,996  7/1988  Ogawa et al. .................. 428/665

FOREIGN PATENT DOCUMENTS 01060813  3/1989  Japan .

Primary Examiner—Stevan A. Resan
Attorney, Agent, or Firm—Oblon, Spivak, McClelland, Maier & Neustadt, P.C.

[57] ABSTRACT

A metal film type magnetic recording medium in which the saturated magnetic flux density is high and iron having a good corrosion resistance is applied. The magnetic layer comprises metal films formed, in order on a base film, each containing iron, cobalt and nickel as main components.

20 Claims, 2 Drawing Sheets

MAGNETIC RECORDING MEDIUM COMPRISING SUCCESSIVE MAGNETIC METALLIC FILMS OF IRON, NICKEL, AND COBALT DEPOSITED ON A SUBSTRATE

BACKGROUND OF THE INVENTION

1. Field of the Invention

The present invention relates to a novel magnetic recording medium, more specifically to a continuous magnetic substance type magnetic recording medium which is excellent in electromagnetic conversion characteristics and good corrosion resistance.

2. Discussion of the Art

Because of the higher magnetic substance filling rate thereof, a continuous magnetic substance type magnetic recording medium is thin and has a large saturation magnetization as compared with that of a coating type magnetic recording medium. Accordingly, it is suited to high density recording and used in various application fields. Iron, cobalt, nickel, and alloys thereof are usually used for ferromagnetic materials for the above continuous magnetic substance type magnetic recording medium. Of them, cobalt is a ferromagnetic material which is excellent in both coercive force and saturated magnetic susceptibility. However, since cobalt involves problems of corrosion resistance, corrosion resistance is usually given by providing a protective layer and a lubricating layer, or enhanced by turning cobalt into an alloy with nickel with cobalt still being the main component. For example, a cobalt-nickel alloy containing about 20 weight nickel is used for a deposition tape.

However, cobalt not only is a rare resource with supply uncertainty but also is a material having problems in terms of cost. Accordingly, it is advantageous to reduce the use amount of cobalt in a magnetic recording medium. Here, the substitution of iron can be considered because iron is an excellent material in terms of saturation magnetization and is an inexpensive resource present on the earth in large quantities. However, iron is very susceptible to oxidation and inferior in corrosion resistance to cobalt. Accordingly, it would be very useful if iron could effectively be applied in a magnetic recording medium while supplementing the above defects of cobalt. The subject of the present invention is to provide a continuous magnetic substance type magnetic recording medium to which iron is applied and which has a high saturated magnetic flux density and solves the problem of corrosion resistance.

SUMMARY OF THE INVENTION

According to the present invention, in a continuous magnetic substance type magnetic recording medium comprising a magnetic layer formed on a base film by deposition or sputtering, the magnetic layer is composed of metal thin films which are formed in order on the base film and contain iron, cobalt and nickel as main components. In this case, the thickness of a film containing iron as a main component (hereinafter referred to as an iron series film), a film containing cobalt as a main component (hereinafter referred to as a cobalt series film), and a film containing nickel as a main component (hereinafter referred to as a nickel series film) preferably satisfy the thickness relation of iron series film >cobalt series film >(preferably >>) nickel series film. Showing the general ranges thereof in terms of preferred values, the thicknesses are 1000 to 3000 Å in case of the iron series film, 300 to 2000 Å in case of the cobalt series film, and 50 to 500 Å in case of the nickel series film. The thicknesses are preferably 1000 to 1500 Å in case of the iron series film, 300 to 1000 Å in case of the cobalt series film, and 50 to 200 Å in case of the nickel series film. The thicknesses are more preferably 1200 to 1400 Å in case of the iron series film, 400 to 600 Å in case of the cobalt series film, and 100 to 150 Å in case of the nickel series film. All values and subranges between these several limits are included.

The saturated magnetic flux densities of iron, cobalt and nickel which are ferromagnetic materials resides in the order of iron >cobalt >nickel. Meanwhile, the corrosion resistances thereof are in the relation iron <cobalt nickel. That is, since cobalt and iron are liable to change in valency, they are susceptible to oxidation. However, since the iron series film, the cobalt series film and the nickel series film are formed in succession on the base film, the crystal structures in the boundaries between the respective films are different, and therefore a change and a transfer in the valency is prevented, which makes it difficult for the oxidation to proceed. That is, the corrosion resistance is enhanced. Iron is cubic; cobalt is hexagonal; and nickel is cubic.

Accordingly, according to the magnetic recording medium of the present invention having such the metal films as described above, the metal films are hard to be oxidized toward the upper layer of the metal films, and the magnetic energy increases toward the lower part of the magnetic layer. Accordingly, both the corrosion resistance and the magnetic characteristics are enhanced. It is important that the thickness of the nickel series film be reduced to a large extent as compared to the cobalt series film so that the magnetic energy in the vicinity of the surface layer of the magnetic layer does not become insufficient. These films may be formed by deposition or sputtering according to art-accepted techniques. The respective films may be formed by the simple substances of iron, cobalt and nickel or may contain them as a main component. Here, by "main component" it is meant that the element is contained by 60 weight % or more based on total weight of film.

The magnetic recording medium of the present invention can be produced by means of PVD (physical vapor deposition) such as deposition and sputtering. An example of a deposition method in which a film-forming speed is fast can be explained as follows. First put into the crucible of an oblique deposition apparatus is, for example, an Fe series metal material in which Fe out of all metal components, accounts for 95 to 98.5 weight % Fe having a purity of 95 to 98.5 weight %, and the total amount of Au, Pt and Ag accounting for 0 to 0.05 weight % (nothing can be better than zero but they are contained as inevitable impurities to some extent in some cases; if contained, the total amount of Au, Pt and Ag is controlled to as a small amount as possible, for example, 0.05 weight % or less) with the balance being other metal components (for example, Co, Ni, Mn, Cr and the like). The reason for using the Fe material having such purity (95 to 98.5 weight %) is because it is far more inexpensive as compared with Fe having as high a purity as 99.95 weight % or more. However, high purity Fe having a purity of 98.5 weight % or more will not be prevented from being used. The oblique deposition apparatus is exhausted to a prescribed vacuum degree, and the Fe series metal material is evaporated by an electron gun or other means to cause Fe series metal particles to adhere and deposit on a running support. Since Fe having a purity of 100 weight % is not used as an Fe material put on the evaporation resource, metal elements other than Fe are contained in the resulting metal magnetic film. For example, Co, Ni, Mn, Cr and the like are contained. Further, Au, Pt and Ag are contained, though in the trace amounts (0.05 weight or less), in some cases. When other metal components are contained in cobalt and nickel other than Fe, the contents thereof preferably correspond to those in Fe.

In general, the base film preferably consists of polyethylene terephthalate. However, there can be used as well polyesters such as polyethylene naphthalate, polyolefins such as polyethylene and polypropylene, cellulose derivatives such as cellulose triacetate and cellulose diacetate, plastics such as polycarbonate, polyvinyl chloride, polyimide, and aromatic polyamide, etc. These supports preferably have thicknesses of from 3 to 50 μm.

According to the present invention, the magnetic recording medium can have a protective layer comprising diamond-like carbon on the uppermost metal film. This protective layer is formed by means of ECR and preferably has as a thickness of 30 to 300 Å. Further, a back coat layer and/or a lubricating layer can be provided on the magnetic recording medium of the present invention. The materials, thicknesses and forming methods of these layers are suitably selected according to applications by art-known techniques.

As described above, the present invention can provide a continuous magnetic substance type magnetic recording medium having excellent corrosion resistance and good output characteristics.

BRIEF DESCRIPTION OF THE DRAWINGS

A more complete appreciation of the invention and many of the attendant advantages thereof will be readily obtained as the same becomes better understood by reference to the above detailed description when considered in connection with the accompanying drawings, wherein.

EXPLANATION OF THE CODES

Figure 1:
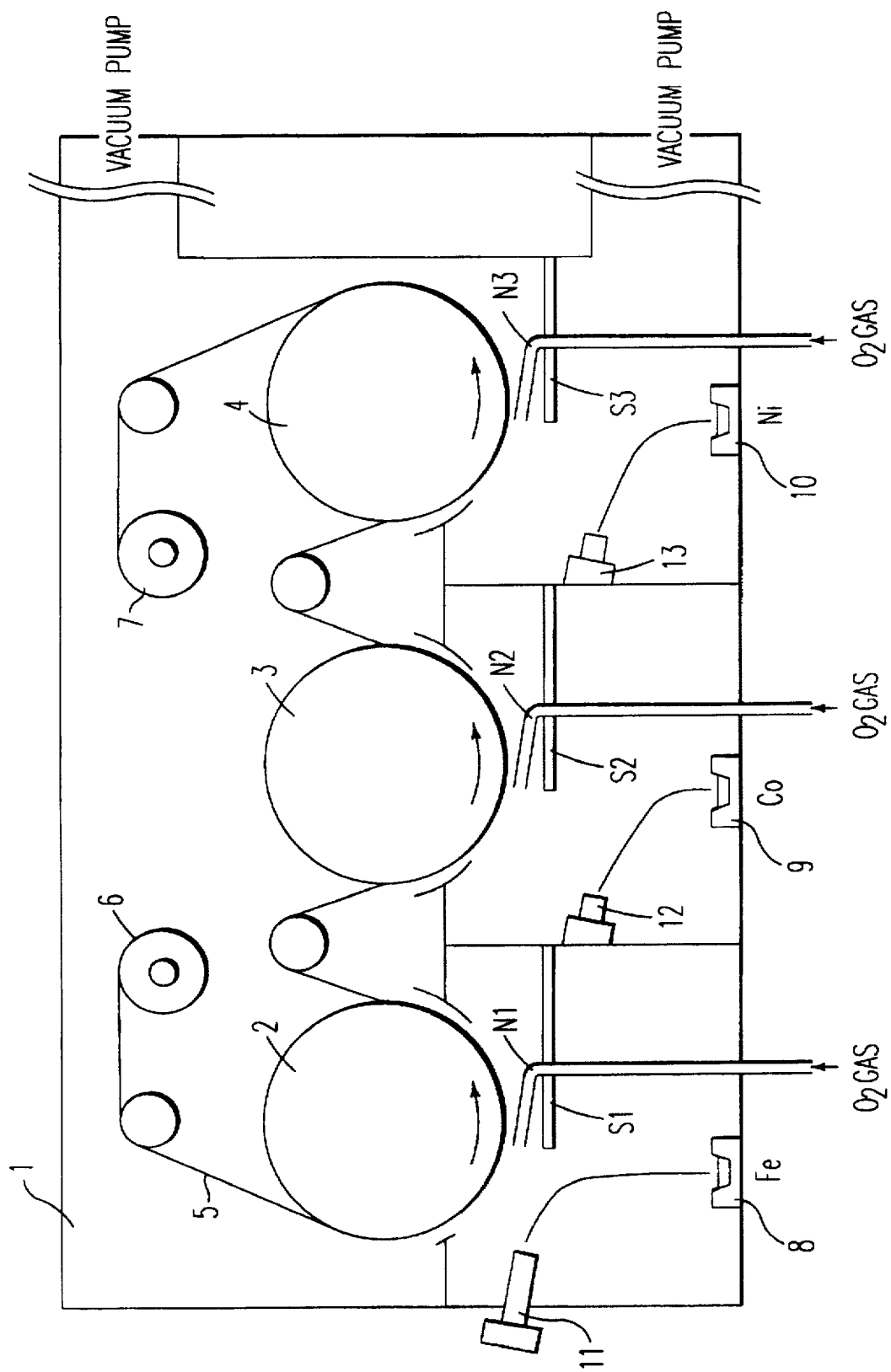
FIG. 1 is a schematic drawing showing one example of an apparatus used for producing the magnetic recording medium of the present invention.

1: Vacuum chamber
2 to 4: Cooling can rolls
5: Base film
6: Take-out roll
7: Take-up roll
8 to 10: Crucibles
11 to 13: Electron guns
S1 to 3: Shielding plates
N1 to 3: Nozzles FIG. 1 shows schematically one example of a production apparatus suitable for forming a magnetic layer on the magnetic recording medium of the present invention by deposition. This includes a vacuum chamber 1 connected to an unillustrated vacuum source, for example, a vacuum pump, three cooling can rolls 2 to 4 disposed in the vacuum chamber 1, and a take-out roll 6 and a take-up roll 7 for allowing a base film 5 such as a PET film to run on these cooling can rolls 2 to 4. Crucibles 8 to 10 which are evaporation resources for metals are disposed under the respective cooling can rolls 2 to 4. Electron guns 11 to 13 corresponding to these crucibles are disposed in the chamber 1 and are designed to apply polarized electron beams toward the respective crucibles 8 to 10 to evaporate metals put in the crucibles, respectively. Shielding plates S1 to 3 for limiting the incident range of metal vapor which is evaporated with the electron beams and goes toward the cooling can rolls from the crucibles to an oblique direction, and nozzles N1 to 3 for feeding oxygen gas are disposed between the respective crucibles and cooling can rolls. An iron series film may be converted to an Fe—N—O series film by introducing nitrogen gas together with oxygen gas in depositing.

The invention will now be further described by reference to the following non-limiting examples.

EXAMPLE 1

Figure 2:
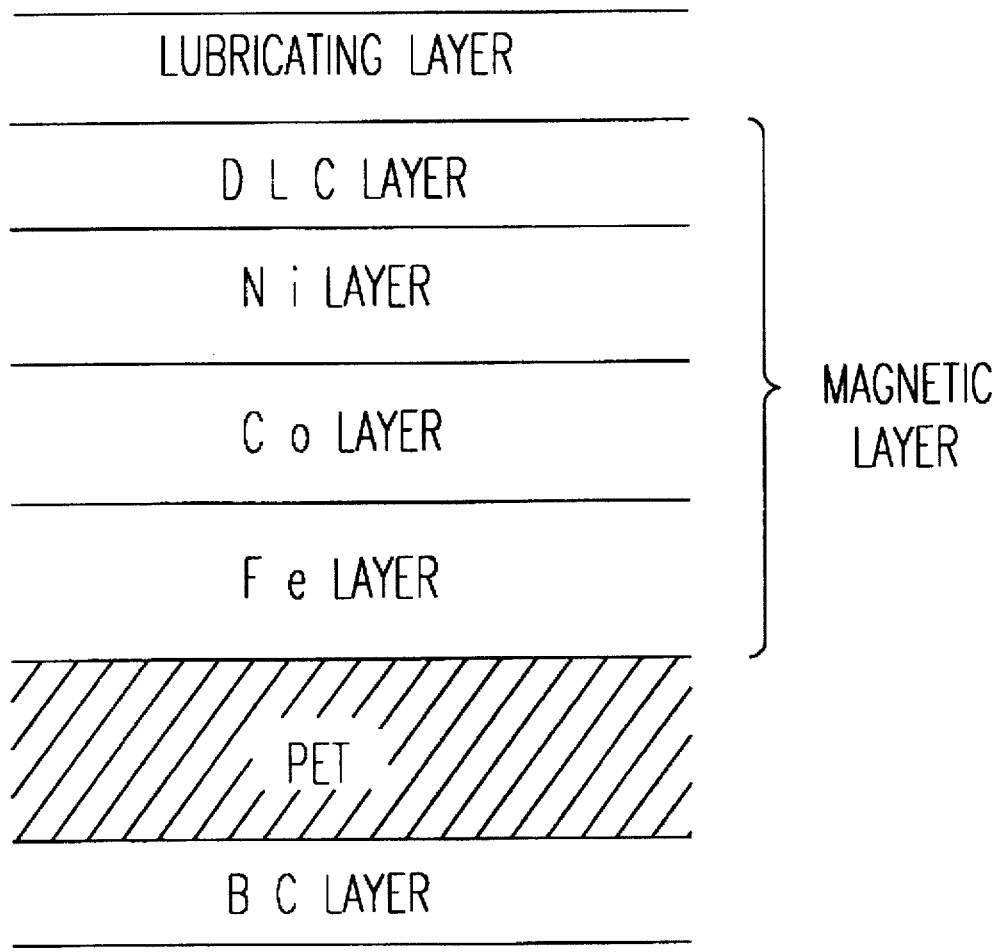
FIG. 2 is a cross-sectional drawing showing schematically one example of the magnetic recording medium of the present invention.

The apparatus of FIG. 1 is used and iron is put into the crucible 8, cobalt into the crucible 9, and nickel into the crucible 10. After exhausting the vacuum chamber 1 to $10^{-6}$ Torr, the electron beams were applied to the respective metals put in the crucibles 8 to 10 with the respective electron guns 11 to 13 at 50 kW, 20 kW and 10 kW to melt and evaporate them to prepare a deposition environment. A PET film having a thickness of 6.8 micrometer was caused to run on the cooling can rolls 2 to 4 at a speed of 50 m/minute, and oxygen gas was introduced from the nozzles N1 to 3 at 400 SCCM, 200 SCCM and 106 SCCM, respectively to form an iron film layer of 1400 Å, a cobalt film layer of 400 Å, and a nickel film layer of 100 Å on the base film 5 by oblique deposition. Then, a diamond-like carbon (DLC) layer was formed to a thickness of 70 Å on the resulting layers at a microwave power of 500 W in an another chamber by ECR plasma CVD method. A fluorine series lubricant (brand name: FOMBLIN AM2001) was adhered on this protective layer in a thickness of 20 Å, and a back coat layer comprising carbon and a binder was coated on the back face of the PET film in a thickness of 0.5 micrometer. The PET film thus coated was cut to a width of 8 mm, and the cut film was loaded into a cassette to prepare a 8 mm video cassette. The schematic cross section of the magnetic tape thus obtained is shown in FIG. 2. This tape had a coercive force of 1600 Oe.

EXAMPLE 2

A 8 mm video cassette was prepared in the same manner as that in Example 1, except that the electron beam outputs from the electron guns 11 to 13 were set at 46 kW, 25 kW and 12 kW, respectively and the iron film layer, the cobalt film layer and the nickel film layer were formed in the layer thicknesses of 1300 Å, 460 Å and 130 Å, respectively. The coercive force was 1610 Oe.

EXAMPLE 3

A 8 mm video cassette was prepared in the same manner as that in Example 1, except that the electron beam outputs from the electron guns 11 to 13 were set at 43 kW, 27 kW and 15 kW, respectively and the iron film layer, the cobalt film layer and the nickel film layer were formed in the layer thicknesses of 1260 Å, 480 Å and 150 Å, respectively. The coercive force was 1630 Oe.

EXAMPLE 4

A 8 mm video cassette was prepared in the same manner as that in Example 1, except that the electron beam outputs from the electron guns 11 to 13 were set at 50 kW, 20 kW and 11 kW, respectively and the iron film layer, the cobalt film layer and the nickel film layer were formed in the layer thicknesses of 1400 Å, 400 Å and 100 , respectively. Provided that the nickel film layer was formed with the deposition resource of Ni/Cr=95/5 (atomic %). The coercive force was 1620 Oe.

EXAMPLE 5

A 8 mm video cassette was prepared in the same manner as that in Example 1, except that the electron beam outputs from the electron guns 11 to 13 were set at 50 kW, 21 kW and 10 kW, respectively and the iron film layer, the cobalt film layer and the nickel film layer were formed in the layer thicknesses of 1400 Å, 400 Å and 100 Å, respectively. Provided that the cobalt film layer was formed with the deposition resource of Co/Cr=90/10 (atomic %). The coercive force was 1650 Oe.

EXAMPLE 6

A 8 mm video cassette was prepared in the same manner as that in Example 1, except that the electron beam outputs from the electron guns 11 to 13 were set at 52 kW, 20 kW and 10 kW, respectively and the iron film layer, the cobalt film layer and the nickel film layer were formed in the layer thicknesses of 1400 Å, 400 Å and 100 Å, respectively. Provided that the iron film layer was formed by introducing nitrogen gas into an ion gun so that the iron film layer was composed of Fe—N—O. The coercive force was 1590 Oe.

EXAMPLE 7

A 8 mm video cassette was prepared in the same manner as that in Example 1, except that the electron beam outputs from the electron guns 11 to 13 were set at 52 kW, 20 kW and 10 kW, respectively and the iron film layer, the cobalt film layer and the nickel film layer were formed in the layer thicknesses of 1400 Å, 400 Å and 100 Å, respectively. Provided that the iron film layer was formed by introducing nitrogen gas into an ion gun so that the iron film layer was composed of Fe—C—O. The coercive force was 1580 Oe.

COMPARATIVE EXAMPLE 1

A 8 mm video cassette was prepared in the same manner as that in Example 1, except that the thicknesses of the iron film layer, the cobalt film layer and the nickel film layer were set at 400 Å, 200 Å and 1300 Å, respectively, and that the nickel film layer, the cobalt film layer, and the iron film layer were formed in this order (PET/Ni/Co/Fe) on the base film. The coercive force was 1550 Oe.

COMPARATIVE EXAMPLE 2

A 8 mm video cassette was prepared in the same manner as that in Example 1, except that the thicknesses of the iron film layer, the cobalt film layer and the nickel film layer were set at 700 Å, 400 Å and 800 Å, respectively, and the nickel film layer, the iron film layer and the cobalt film layer were formed in this order on the base film. The coercive force was 1570 Oe.

COMPARATIVE EXAMPLE 3

A 8 mm video cassette was prepared in the same manner as that in Example 1, except that only the electron gun 13 and the crucible 10 were used and the alloy of cobalt (85%) and nickel (15%) was used for the deposition material in the crucible and that the film was deposited on the PET film in a thickness of 1900 Å. The coercive force was 1560 Oe.

COMPARATIVE EXAMPLE 4

A 8 mm video cassette having an Fe film layer and a nickel film layer was prepared in the same manner as that in Example 1, except that only the electron gun 11 and the crucible 8 and the electron gun 13 and the crucible 10 were used in the apparatus shown in FIG. 1. The Fe film layer had a thickness of 700 Å, and the nickel film layer had a thickness of 1200 Å. The coercive force was 1580 Oe.

COMPARATIVE EXAMPLE 5

A 8 mm video cassette having an Fe film layer and a cobalt film layer was prepared in the same manner as that in Example 1, except that only the electron gun 11 and the crucible 8 and the electron gun 12 and the crucible 9 were used in the apparatus shown in FIG. 1. The Fe film layer had a thickness of 900 Å, and the cobalt film layer had a thickness of 1000 Å. The coercive force was 1570 Oe.

COMPARATIVE EXAMPLE 6

A 8 mm video cassette having only an Fe film layer was prepared in the same manner as that in Example 1, except that only the electron gun 11 and the crucible 8 were used in the apparatus shown in FIG. 1. The Fe film layer had a thickness of 1900 Å, and the coercive force was 1000 Oe.

The 8 mm video cassettes obtained in the examples and the comparative examples were measured for the electromagnetic conversion characteristics in recording wavelengths of 1 MHz, 5 MHz, 10 MHz, and 15 MHz with an apparatus obtained by remodeling a commercially available VTR (VCR) deck. Further, the retentions (ΔBs) of the saturated magnetic flux densities were measured after leaving for standing at 60°C. and a relative humidity of 90% for 4 weeks. The results thereof are shown in Table 1. In Table 1, the outputs are shown in terms of relative values based on the value of Comparative Example 3.

TABLE 1

| | Thickness of metal film (Å) | | | Output (dB) | | | | | |
| --- | --- | --- | --- | --- | --- | --- | --- | --- | --- |
| | Lower layer Fe series film | Middle layer Co series film | Upper layer Ni series film | 1 MHz | 5 MHz (%) | 10 MHz | 15 MHz (Oe) | Retention ΔBs | Coercive force Hc |
| Invention | | | | | | | | | |
| 1 | 1400 | 400 | 100 | 5 | 5 | 4 | 3 | 95 | 1600 |
| 2 | 1300 | 460 | 130 | 4 | 5 | 3 | 2 | 95 | 1610 |
| 3 | 1260 | 480 | 150 | 4 | 5 | 3 | 1 | 96 | 1630 |
| 4 | 1400 | 400 | 100 A | 5 | 5 | 4 | 2 | 97 | 1620 |
| 5 | 1400 | 400 B | 100 | 5 | 5 | 3 | 3 | 96 | 1650 |
| 6 | C 1400 | 400 | 100 | 4 | 4 | 4 | 3 | 96 | 1590 |
| 7 | D 1400 | 400 | 100 | 3 | 3 | 4 | 3 | 97 | 1580 |

TABLE 1-continued

| | Thickness of metal film (Å) | | | Output (dB) | | | | | |
|---|---|---|---|---|---|---|---|---|---|
| | Lower layer Fe series film | Middle layer Co series film | Upper layer Ni series film | 1 MHz | 5 MHz (%) | 10 MHz | 15 MHz (Oe) | Retention ΔBs | Coercive force Hc |
| Comparison | | | | | | | | | |
| 1 | 1300 (Ni) | 200 | 400 (Fe) | 2 | 2 | 3 | 4 | 68 | 1550 |
| 2 | 800 (Ni) | 700 (Fe) | 400 (Co) | 3 | 3 | 2 | 2 | 87 | 1570 |
| 3 | — | 1900 (Co/Ni = 85/15) | | 0 | 0 | 0 | 0 | 95 | 1560 |
| 4 | 700 | — | 1200 | −1 | −3 | −5 | −6 | 99 | 1580 |
| 5 | 900 | 1000 | — | 2 | 1 | 1 | 1 | 85 | 1570 |
| 6 | 1900 | — | — | 6 | 5 | 3 | 1 | 60 | 1000 |

Remarks -
A: Ni/Cr = 95/5 (atomic %);
B: Co/Cr = 90/10 (atomic %)
C: Fe—N—O series magnetic layer (Fe/N/O = 70/17/3 atomic %) was formed by introducing nitrogen gas into an ion gun;
D: Fe—C—O series magnetic layer (Fe/C/O = 60/22/18 atomic %) was formed by introducing methane gas into the ion gun.

Obviously, numerous modifications and variations of the present invention are possible in light of the above teachings. It is therefore to be understood that within the scope of the appended claims, the invention may be practiced otherwise than as specifically described herein.

This application is based on Japanese patent application 7-20587 filed Feb. 8, 1995, incorporated herein by reference.

What is claimed as new and is desired to be secured by Letters Patent of the United States is:

1. A magnetic recording medium comprising a base film and, provided thereon, a magnetic layer, wherein said magnetic layer comprises a magnetic metallic film containing iron as a main component formed on said base film, a magnetic metallic film containing cobalt as a main component formed on said film containing iron as the main component, and a magnetic metallic film containing nickel as the main component formed on said film containing cobalt as the main component, wherein the film containing iron as the main component has a thickness of 1000 to 3000 Å, the film containing cobalt as the main component has a thickness of 300 to 2000 Å, and the film containing nickel as the main component has a thickness of 50 to 500 Å.

2. A magnetic recording medium as described in claim 1, wherein the respective thicknesses of the film containing iron as the main component, the film containing cobalt as the main component, and the film containing nickel as the main component reside in the order of the film containing iron as the main component >the film containing cobalt as the main component >the film containing nickel as the main component.

3. A magnetic recording medium as described in claim 1, further comprising a protective layer comprising diamond-like carbon provided on the magnetic layer.

4. A magnetic recording medium as described in claim 1, further comprising a back coat layer.

5. A magnetic recording medium as described in claim 3, further comprising a back coat layer.

6. A magnetic recording medium as described in claim 1, further comprising a lubricating layer.

7. A magnetic recording medium as described in claim 3, further comprising a lubricating layer.

8. A magnetic recording medium as described in claim 4, further comprising a lubricating layer.

9. A magnetic recording medium as described in claim 5, further comprising a lubricating layer.

10. The magnetic recording medium of claim 1, wherein the film containing iron as the main component further contains:

oxygen, and carbon or nitrogen.

11. A process of making the magnetic recording of claim 1, comprising:

depositing said film containing iron as the main component on said base film;

depositing said film containing cobalt as the main component on said film containing iron as the main component; and forming said film containing nickel as the main component on said film containing cobalt as the main component.

12. The process of claim 11, wherein the respective thicknesses of the film containing iron as the main component, the film containing cobalt as the main component, and the film containing nickel as the main component reside in the order of the film containing iron as the main component >the film containing cobalt as the main component >the film containing nickel as the main component.

13. The process of claim 11, wherein said magnetic recording medium further comprises a protective layer comprising diamond-like carbon provided on the magnetic layer.

14. The process of claim 11, wherein said magnetic recording medium further comprises a back coat layer.

15. The process of claim 13, wherein said magnetic recording medium further comprises a back coat layer.

16. The process of claim 11, wherein said magnetic recording medium further comprises a lubricating layer.

17. The process of claim 13, wherein said magnetic recording medium further comprises a lubricating layer.

18. The process of claim 14, wherein said magnetic recording medium further comprises a lubricating layer.

19. The process of claim 15, wherein said magnetic recording medium further comprises a lubricating layer.

20. The process of claim 11, wherein the film containing iron as the main component further contains:

oxygen, and carbon or nitrogen.

* * * * *